US008785810B2

(12) United States Patent  
Hyun et al.

(10) Patent No.: US 8,785,810 B2  
(45) Date of Patent: Jul. 22, 2014

(54) LASER OPTICAL SYSTEM, REPAIR APPARATUS AND METHOD USING THE SAME

(75) Inventors: Jeong Woo Hyun, Suwon-si (KR); Jung Sub Lee, Suwon-si (KR); Sung Jin Lee, Seongnam-si (KR); Sang Kyu Lim, Seoul (KR); Kwang Soo Kim, Suwon-si (KR); Jae Kwang Lee, Yongin-Si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 404 days.

(21) Appl. No.: 13/279,716

(22) Filed: Oct. 24, 2011

(65) Prior Publication Data

US 2012/0103955 A1    May 3, 2012

(30) Foreign Application Priority Data

Oct. 27, 2010  (KR) ........................ 10-2010-0105098

(51) Int. Cl.  
*B23K 26/02* (2014.01)  
*B23K 26/08* (2014.01)  
*G02B 7/02* (2006.01)

(52) U.S. Cl.  
CPC ................. *B23K 26/02* (2013.01); *B23K 26/08* (2013.01); *G02B 7/02* (2013.01)  
USPC ............ 219/121.62; 219/121.73; 219/121.83; 349/192; 356/237.1; 359/694; 372/24

(58) Field of Classification Search  
CPC ........... B23K 26/02; B23K 26/08; G02B 7/02  
USPC ........... 219/121.73, 121.83, 121.62; 349/192, 349/54, 55; 250/492.1; 356/237.1; 359/694, 359/223.1; 372/24; 438/30; 430/20  
See application file for complete search history.

(56) References Cited

U.S. PATENT DOCUMENTS

| | | | |
|---|---|---|---|
| 4,712,887 A * | 12/1987 | Baer | 359/223.1 |
| 7,545,162 B2 | 6/2009 | Chung | |
| 7,955,906 B2 * | 6/2011 | Cordingley et al. | 438/132 |
| 2004/0239364 A1 | 12/2004 | Chung | |
| 2006/0285068 A1 * | 12/2006 | Kawada et al. | 349/192 |

FOREIGN PATENT DOCUMENTS

| JP | 08-201813 A | 8/1996 |
|---|---|---|
| JP | 11-264961 A | 9/1999 |
| KR | 20040103998 A | 12/2004 |

* cited by examiner

*Primary Examiner* — Samuel M Heinrich  
(74) *Attorney, Agent, or Firm* — Harness, Dickey & Pierce, P.L.C.

(57) ABSTRACT

According to example embodiments, a laser optical system includes a laser generator, at least one scan module, an objective lens, a relay lens, a review optical system, and a control device. The laser generator is configured to generate a laser beam. The at least one scan module is configured to reflect the laser beam generated by the laser generator and to direct the laser beam in different directions. The objective lens is configured to focus the laser beam on a substrate. The relay lens is configured to guide the laser beam scanned by the at least one scan module to within an incident range of the objective lens. The review optical system is configured to monitor, in real time, repair of the substrate using the laser beam. The control device is configured to control the at least one scan module.

14 Claims, 8 Drawing Sheets

LASER OPTICAL SYSTEM, REPAIR APPARATUS AND METHOD USING THE SAME

CROSS-REFERENCE TO RELATED APPLICATION

This application claims priority under 35 U.S.C. §119 to Korean Patent Application No. 2010-0105098, filed on Oct. 27, 2010 in the Korean Intellectual Property Office (KIPO), the entire contents of which is incorporated herein by reference.

BACKGROUND

1. Field

Example embodiments relate to a laser optical system, a repair apparatus and a method using the same.

2. Description of the Related Art

In general, a special pattern may be formed or a mark having a desired shape may be formed on a target object using a laser and a pattern such as a circuit pattern may be formed on a semiconductor wafer or a Liquid Crystal Display (LCD) panel. When such a pattern or mark is formed, defects may occur. In order to increase yield, a target object is inspected so as to detect defects and such defects are corrected.

Defect removing apparatuses developed to date have a structure in which an LCD panel or mother glass is laid on a working stage, is reviewed in real time using a CCD camera while moving the stage or a gantry on which a laser optical system is mounted, and a repair process is performed. However, in this structure, for laser repair of a micrometer scale unit pixel, since a laser system moves along a working route in micrometer scale steps, it takes considerable time to perform in a repair process.

In addition, there is a laser repair apparatus using a scan module. Such a repair apparatus may perform a desired laser repair process without moving a gantry on which a laser optical system is mounted and a working stage. However, due to the structural characteristics of an optical system using an F-theta lens, real-time review using a CCD camera may not be possible.

SUMMARY

According to example embodiments, a laser optical system includes a laser generator configured to generate a laser beam, at least one scan module configured to reflect the laser beam generated by the laser generator and to direct the laser beam in different directions, an objective lens configured to focus the laser beam on a substrate, a relay lens configured to guide the laser beam scanned by the at least one scan module to within an incident range of the objective lens, a review optical system configured to monitor, in real time, repair of the substrate using the laser beam, and a control device configured to control the at least one scan module.

According to example embodiments, wherein the relay lens is between the at least one scan module and the objective lens and an optical space is between the at least one scan module and the objective lens, the optical space enabling display of the repair of the substrate using the review optical system in real time.

According to example embodiments, the substrate is a Liquid crystal Display (LCD) and the laser beam repairs defects of the LCD.

According to example embodiments, the objective lens is configured to compress the laser beam to a pixel size of the LCD.

According to example embodiments, the at least one scan module is configured to change a travel direction of the laser beam into at least two different directions.

According to example embodiments, the at least two different directions are an X axis direction and a Y axis direction, the at least one scan module includes at least two scan mirrors, the at least two scan mirrors are configured to continuously scan the laser beam, and one of the at least two scan mirrors scans the laser beam along the X axis direction and the other scan mirror of the at least two scan mirrors scans the laser beam along the Y axis direction.

According to example embodiments, the laser optical system includes at least two scan modules. Each scan module of the at least two scan modules includes one scan mirror, one scan module of the at least two scan modules scans the laser beam along an X axis direction and the other scan module of the at least two scan modules scans the laser beam along a Y axis direction.

According to example embodiments, the at least one scan module includes one scan mirror, the scan mirror configured to scan the laser beam along X and Y axes directions.

According to example embodiments, the control device is configured to control a position of a spot of the laser beam emitted from the objective lens on the substrate.

According to example embodiments, the review optical system includes, an illumination device configured to provide illumination during monitoring of the repair, an auto focusing device configured to correct a focus of the laser optical system or the review optical system, and a review camera configured to monitor the repair of the LCD in real time.

According to example embodiments, the laser optical system further includes a tube lens configured to be detachably provided such that the laser optical system can be switched between an image-to-image optical system and a spot optical system.

According to example embodiments, wherein the laser optical system is configured to function as an image-to-image optical system when the tube lens is included between the laser generator and the scan module and is configured to function as a spot optical system when the tube lens is not included.

According to example embodiments, a repair apparatus includes the laser optical system, a gantry configured to include the laser optical system mounted thereon, a stage configured to have the substrate placed thereon, and a monitor configured to display a result of the monitoring by the review optical system.

According to example embodiments, a repair method includes generating a laser beam to repair a substrate, reflecting the generated laser beam using a least one scan module to direct the laser beam in different directions, focusing the laser beam on the substrate using an objective lens, guiding the scanned laser beam using a relay lens to within an incident range of the objective lens, monitoring repair of the substrate in real time using a review optical system, and displaying a result of the monitoring in real time.

BRIEF DESCRIPTION OF THE DRAWINGS

The above and other features and advantages will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Example embodiments will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
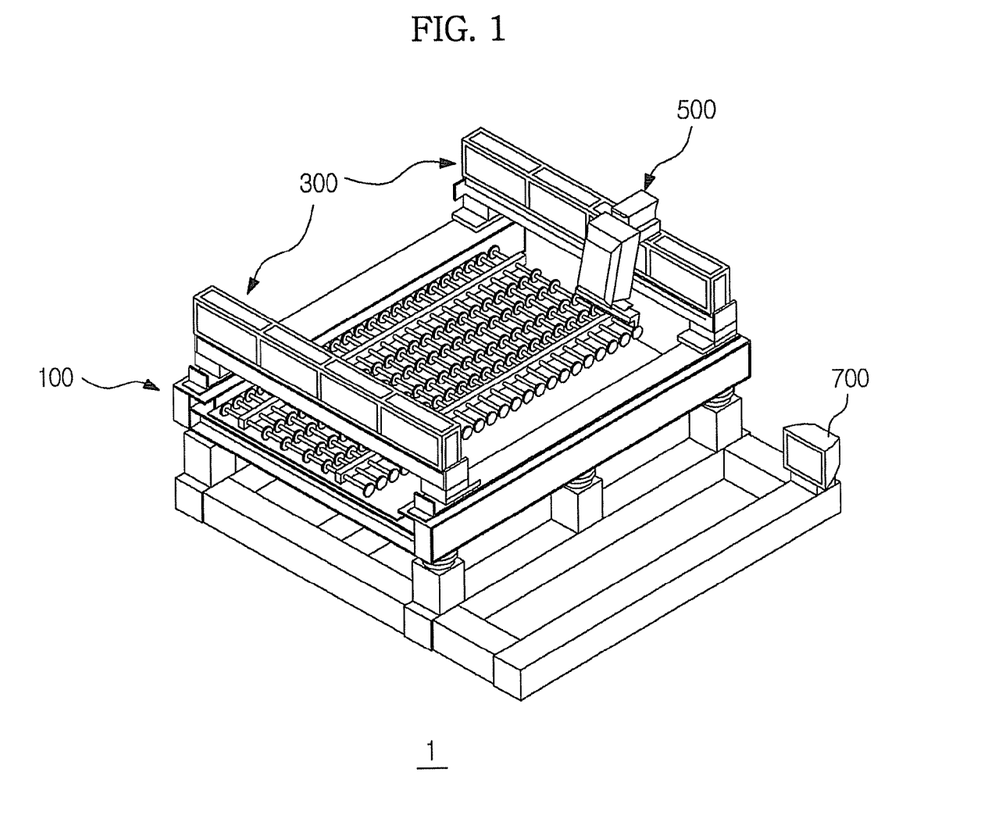
FIG. 1 is a perspective view showing a repair apparatus having a laser optical system according to example embodiments.

FIG. 1 is a perspective view showing a repair apparatus having a laser optical system according to example embodiments. Hereinafter, a description will be given with reference to FIGS. 1 to 3.

The repair apparatus 1 includes a stage 100, a gantry 300, a laser optical system 500 and a monitor 700.

The stage 100 may be fixedly or transferably mounted in the repair apparatus 1 in a state in which a substrate is laid thereon. If the stage is transferably mounted, the stage may be transferred to a region in which a laser beam is irradiated onto the substrate laid on the stage 100.

The substrate is a plate on which electric circuits are formed, for example, an insulating substrate on a surface of which conductive patterns may be formed. By irradiating a laser beam onto the substrate, the substrate may be subjected to ablation, carbonization, special patterning and/or marking. Laser ablation is generally employed to repair a thin film transistor (TFT), and carbonization is generally employed to repair of a color filter (CF). A laser optical system according to example embodiments performs a repair process including ablation or carbonization.

In the repair apparatus having the laser optical system according to the embodiment of the present invention, the substrate is a Liquid Crystal Display (LCD) and a process of repairing defects of the LCD using a laser beam is performed.

The laser optical system 500 is mounted on the gantry 300. The gantry 300 is fixedly or transferably mounted in the repair apparatus 1, similar to the stage 100. If the gantry 300 is transferably mounted, the laser optical system 500 mounted on the gantry 300 is movable.

The laser optical system 500 irradiates a laser beam to an LCD 570, for repair of the LCD 570. The laser optical system 500 may be fixedly or transferably mounted to the gantry 300. In the repair apparatus 1 having the laser optical system according to example embodiments, the laser optical system 500 is fixed to the gantry 300 and the angle of a scan mirror of a scan module 510 included in the laser optical system 500 is adjusted so as to repair defects (for example, minute defects) of the LCD 570.

The monitor 700 displays a repair process image captured by a review camera 551 included in a review optical system 550 to a user in real time.

Figure 2:
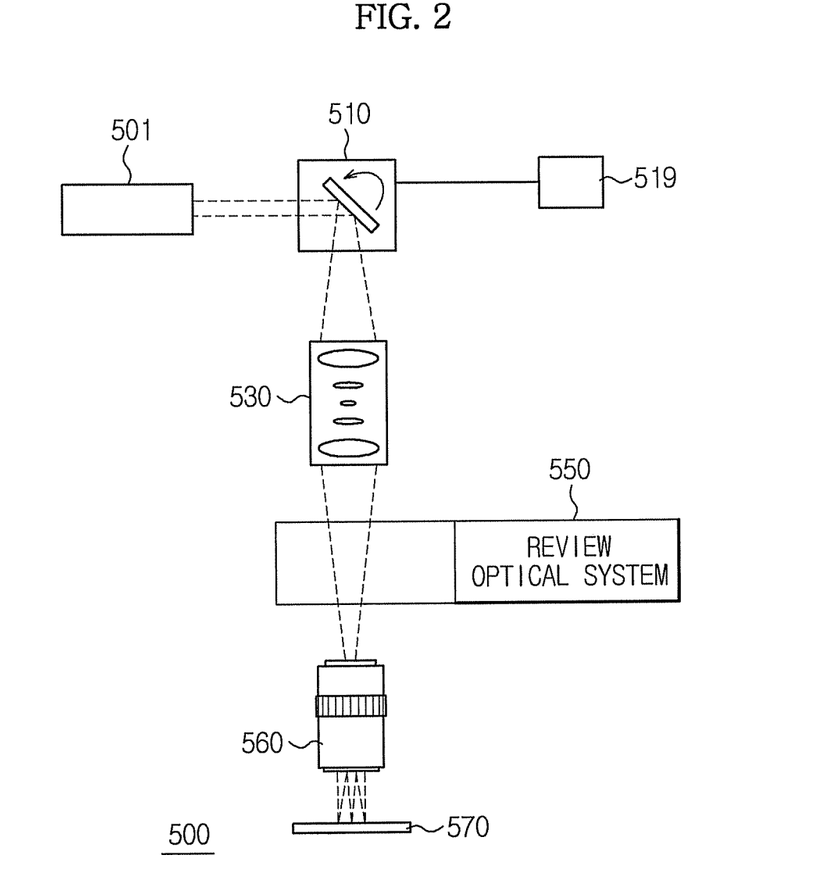
FIG. 2 is a diagram showing the structure of a laser optical system according to example embodiments.

FIG. 2 is a diagram showing the structure of a laser optical system according to example embodiments.

Figure 3:
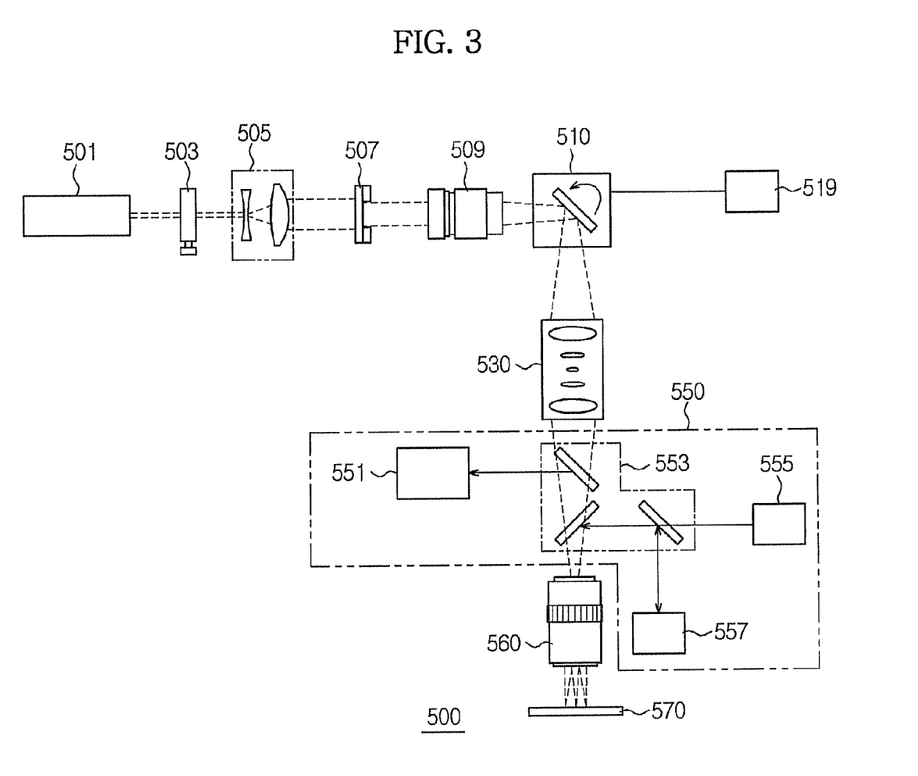
FIG. 3 is a diagram showing the structure of a laser optical system according to example embodiments.

FIG. 3 is a diagram showing the structure of a laser optical system according to example embodiments.

Hereinafter, the structures of the laser optical systems shown in FIGS. 2 and 3 will be described. The laser optical system 500 shown in FIG. 3 includes components which may be added to the components shown in FIG. 2.

The laser optical system 500 includes a laser generator 501, a scan module 510, a control device 519, a relay lens 530, a review optical system 550 and an objective lens 560.

The laser generator 501 generates a laser beam, for repair of the LCD 570. The laser beam may be generated by various laser sources such as a nanosecond, picosecond or femtosecond pulsed laser source.

The scan module 510 includes a scan mirror to perform scanning in X- and Y-axis directions and reflects the laser beam generated by the laser generator 501 at various angles (for example, various desired angles). The X-axis direction may be set to be perpendicular to the gantry 300 in which the laser optical system 500 is mounted and the Y-axis direction is set to be perpendicular to the X-axis direction. The scan module 510 reflects the laser beam at various angles to repair defects of the LCD 570. Accordingly, the scan module 510 enables repairs to be more rapidly performed than in the case where defects are located by moving the stage 100 and/or the gantry 300 to repair the LCD 570. As a result, a takt time is remarkably reduced. Takt time refers to a time required to process one unit of a product and is used as a metric for production efficiency and herein indicates a time required to repair one defect of the LCD 570.

The control device 519 adjusts the angle of the scan module 510, in order to adjust the position of a spot of a laser beam emitted from the objective lens 560 on the LCD 570. The scan module 510 adjusts the laser beam generated in the laser optical system 500 and guides the laser beam onto the substrate using the scan mirror included in the scan module 510. The laser beam emitted from the laser generator 501 is reflected by the scan module 510 through a shutter 503, is guided through the relay lens 530, and is incident upon the objective lens 560, thereby performing a repair process with respect to the substrate 570. Since the position of the laser beam irradiated on the substrate, for example, the LCD 570, is determined by the angle or distance between the scan mirror included in the scan module 510 and the substrate, the control device 519 to adjust the scan module 510 operates to determine where on the LCD 570 the laser beam is irradiated.

The relay lens 530 guides the reflected laser beam such that the laser beam reflected by the scan module 510 travels in a desired direction without spreading. For example, the relay lens 530 guides the laser beam scanned by the scan module 510 to within the incident range of the objective lens 560. Since the relay lens 530 is mounted between the scan module 510 and the objective lens 560, a space is optically secured. By mounting the review optical system 550 within this space, a user may view the process of repairing defects of the LCD 570 in real time. In the related art in which the scan module 510 is used, the laser beam reflected by the scan module 510 was directly incident upon the objective lens 560. In this case, rapid repair is realized using the scan module 510, but real-time review is not performed due to physical limitations of the scan module 510 and the objective lens 560. By mounting the relay lens 530, it is possible to perform real-time review of the repair process using the review optical system 550.

The review optical system 550 enables the user to view the process of repairing defects of the LCD 570 in real time. In addition, in the repair process, the LCD panel may fail if even the slightest error is present. Accordingly, real-time review using the review optical system 550 is necessary.

The review optical system 550 includes a review camera 551, a mirror 553, an illumination device 555, and a Laser Auto Focusing (LAF) device 557.

The review camera 551 photographs a region of the LCD 570, which is currently being repaired, in real time and displays the region to the user using the monitor 700 in real time, thereby realizing real-time review.

The illumination device 555 functions as a light source for review. The illumination device 555 generates light such that the review camera 551 photographs a process of repairing the LCD 570 using the laser beam.

The mirror 553 adjusts the direction of the light generated by the illumination device 555 such that the review camera 551 photographs the laser repair image.

The LAF device 557 corrects the focus of the laser optical system 500 such that the focus of the laser optical system 500 is accurately positioned on a surface of the LCD 570 to be repaired.

The objective lens 560 serves to compress the laser beam such that the laser beam incident to the objective lens 560 through the scan module 510 or the relay lens 530 is focused according to the pixel size of the LCD 570. The laser beam compressed by the objective lens 560 may be focused on the LCD 570 to repair defects of the LCD 570. It is possible to secure high laser beam resolution and to enable the laser beam to have high energy density using the objective lens 560.

The laser optical system 500 may further include a shutter 503, a beam expander 505, a slit 507, and a tube lens 509.

The shutter 503 functions as a switch to control the output of the laser beam to control the repair process of the LCD 570.

The beam expander 505 expands the laser beam generated by the laser generator or averages the energy distribution of the laser beam.

The slit 507 alters the laser beam into various shapes such as a circular shape, a rectangular shape and a diamond shape.

The tube lens 509 reduces the size of the laser beam expanded by the beam expander 505. In addition, if the tube lens 509 is inserted into the laser optical system 500, this optical system functions as an image-to-image optical system. If the tube lens 509 is removed, this optical system functions as a spot optical system. An optical system using a laser is divided into an image-to-image optical system and a spot optical system according to a focusing method of a light source thereof. The image-to-image optical system is suitable for shaping such as patterning because various laser beam shapes may be attained using a slit. The spot optical system is suitable for a high-energy ablation process and carbonization process because energy loss of the laser beam is minimized so as to increase energy at one point.

Accordingly, since switching between the image-to-image optical system and the spot optical system is freely performed by providing a mechanism for inserting/removing the tube lens 509, an adequate optical system is selected according to a working process so as to perform in laser processing.

Figure 4:
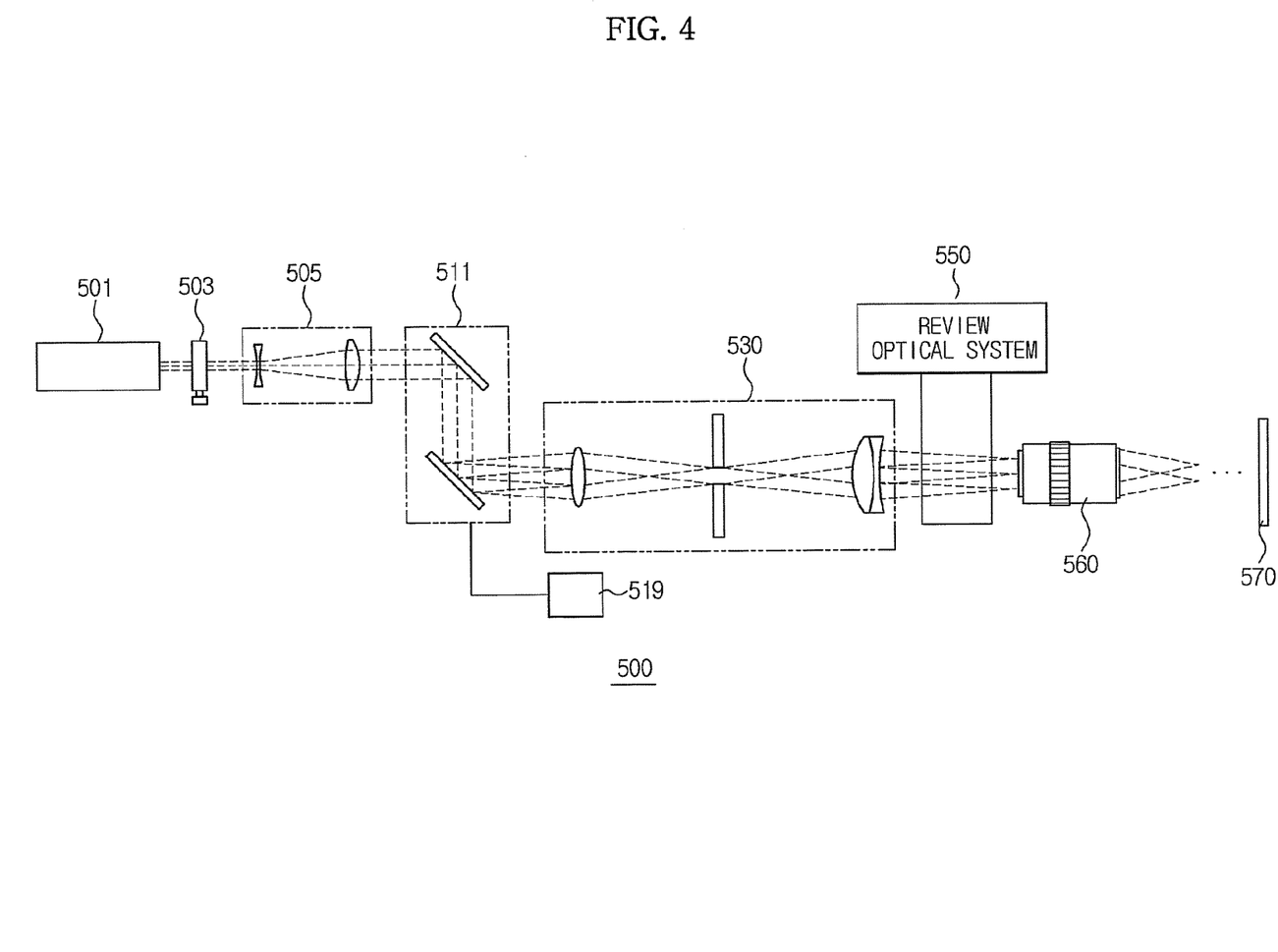
FIG. 4 is a diagram showing the structure of a laser optical system according to example embodiments.

FIG. 4 is a diagram showing the structure of a laser optical system according to example embodiments.

The laser optical system 500 in FIG. 4 includes a laser generator 501, a shutter 503, a beam expander 505, a scan module 511, a control device 519, a relay lens 530, a review optical system 550 and/or an objective lens 560.

The laser beam generated by the laser generator 501 is incident upon the scan module 511 through the shutter 503 and the beam expander 505, and the reflection angle of the scan module 511 is controlled by the control device 519.

The scan module 511 includes two scan mirrors. The two scan mirrors are provided so as to continuously scan the incident laser beam. One of the two scan mirrors scans the laser beam along the X axis and the other scan mirror scans the laser beam along the Y axis, thereby scanning the laser beam in two dimensions.

The laser beam scanned by the scan module 511 reaches the objective lens 560 through the relay lens 530 and the laser beam is irradiated onto the LCD 570 through the objective lens 560, thereby repairing defects of the LCD 570. The routes of the laser beam between the relay lens 530 and the objective lens 560 and between the objective lens 560 and the LCD 570 are collected by the review optical system 550 such that the user views the process of repairing the LCD 570 in real time.

Figure 5:
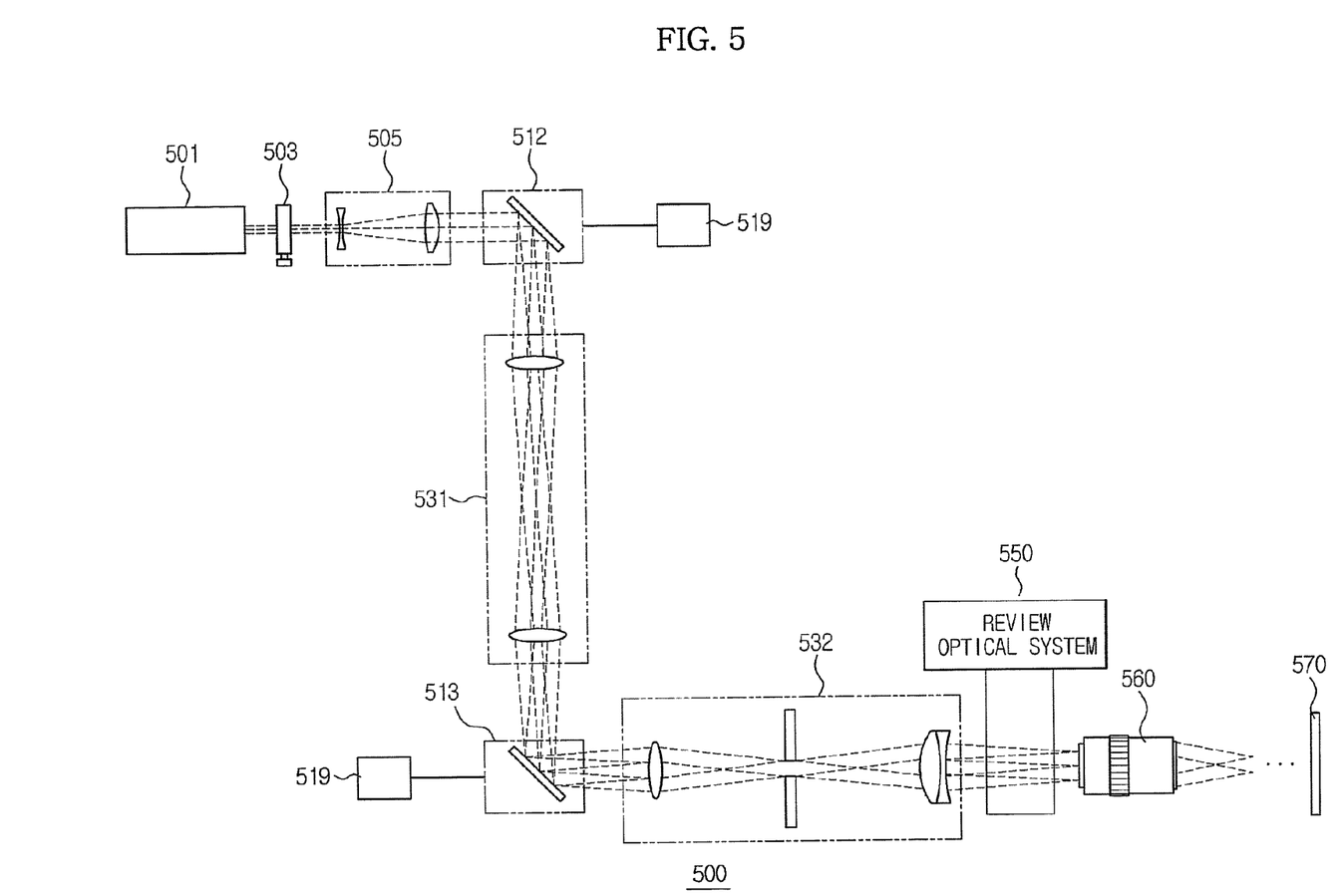
FIG. 5 is a diagram showing the structure of a laser optical system according to example embodiments.

FIG. 5 is a diagram showing the structure of a laser optical system according to example embodiments.

The laser optical system 500 in FIG. 5 includes a laser generator 501, a shutter 503, a beam expander 505, scan modules 512 and 513, a control device 519, two relay lenses 531 and 532 (hereinafter, respectively referred to as a first relay lens 531 and a second relay lens 532), a review optical system 550, and an objective lens 560. The laser beam generated by the laser generator 501 is incident upon the scan modules 512 and 513 through the shutter 503 and the beam expander 505. The reflection angles of the scan modules 512 and 513 are controlled by the control device 519.

In the example embodiment of FIG. 5, two separate scan modules 512 and 513 are included, unlike the scan module 511 shown in FIG. 4. Each of the two scan modules 512 and 513 includes one scan mirror. One of the scan modules 512 (hereinafter, referred to as a first scan module) of the two scan modules scans the laser beam along the X axis and the other scan module 513 (hereinafter, referred to as a second scan module) scans the laser beam along the Y axis, thereby scanning the laser beam in two dimensions.

The laser beam scanned in the X-axis direction by the first scan module 512 reaches the second scan module 513 through the first relay lens 531. The second scan module 513 scans the laser beam in the Y-axis direction. The scanned laser beam reaches the objective lens 560 through the second relay lens 532, and the laser beam is irradiated onto the LCD 570 through the objective lens 560, thereby repairing defects of the LCD 570. The routes of the laser beam between the second relay lens 532 and the objective lens 560 and between the objective lens 560 and the LCD 570 are observed through the review optical system 550 such that the user views the process of repairing the LCD 570 in real time.

As shown in FIG. 5, the second relay lens 532 may include a slit similar to the slit 507 in FIG. 3 and the first relay lens 531 may not include the slit. As such, the slit to change the size and shape of the laser beam may be selectively included in the relay lenses 531 and 532.

Figure 6:
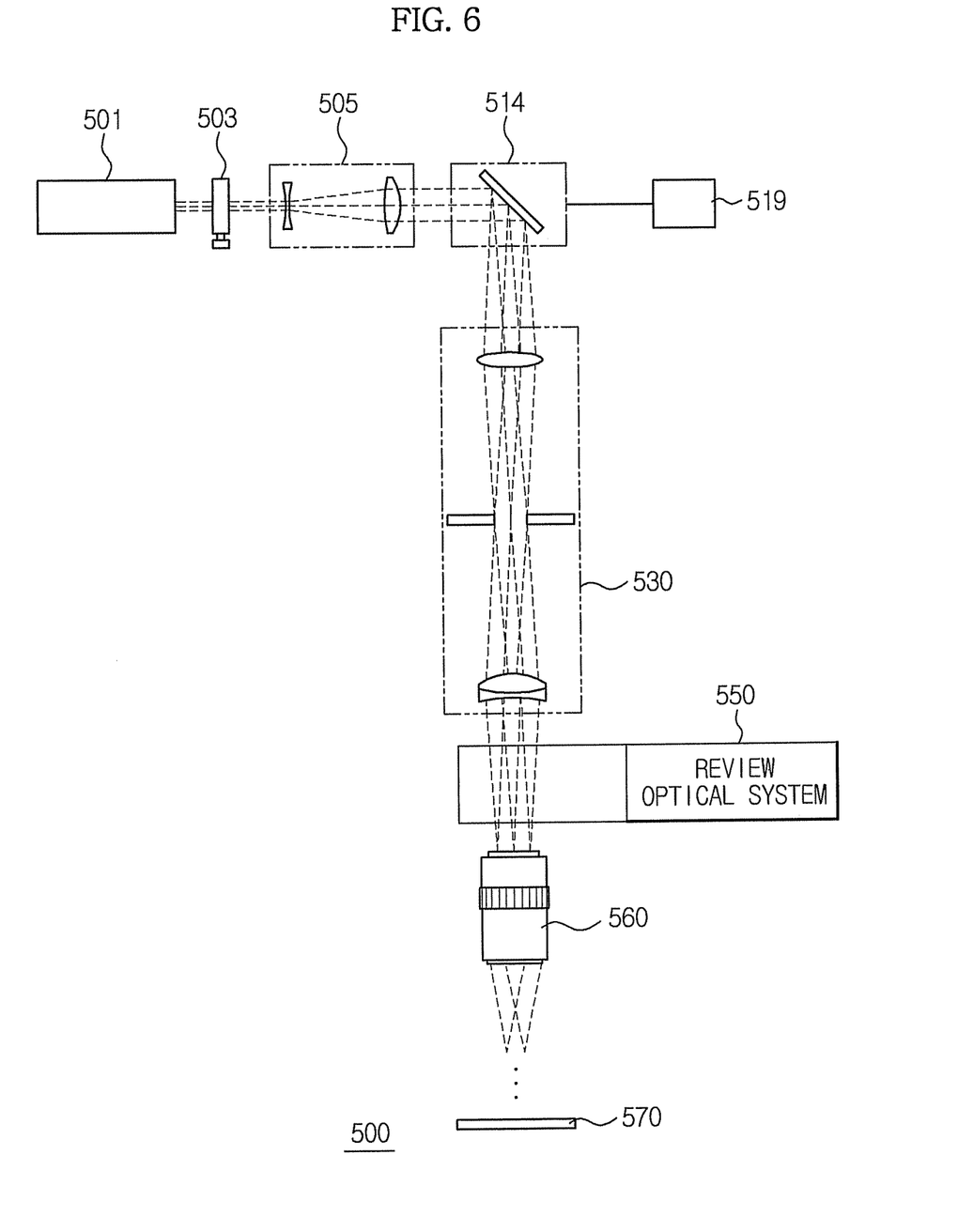
FIG. 6 is a diagram showing the structure of a laser optical system according to example embodiments.

FIG. 6 is a diagram showing the structure of a laser optical system according to example embodiments.

The laser optical system 500 in FIG. 6 includes a laser generator 501, a shutter 503, a beam expander 505, a scan module 514, a control device 519, a relay lens 530, a review optical system 550, and an objective lens 560. The laser beam generated by the laser generator 501 is incident upon the scan module 514 through the shutter 503 and the beam expander 505. The reflection angle of the scan module 514 is controlled by the control device 519.

The scan module 514 includes one scan mirror to simultaneously scan the laser beam along the X and Y axes, unlike the scan modules 511, 512 and 513 shown in FIGS. 4 and 5, thereby scanning the laser beam in two dimensions.

The laser beam scanned by the scan module 514 reaches the objective lens 560 through the relay lens 530, and the laser beam is irradiated onto the LCD 570 through the objective lens 560, thereby repairing defects of the LCD 570. The routes of the laser beam between the relay lens 530 and the objective lens 560 and between the objective lens 560 and the LCD 570 are observed through the review optical system 550 such that the user views the process of repairing the LCD 570 in real time.

Figure 7:
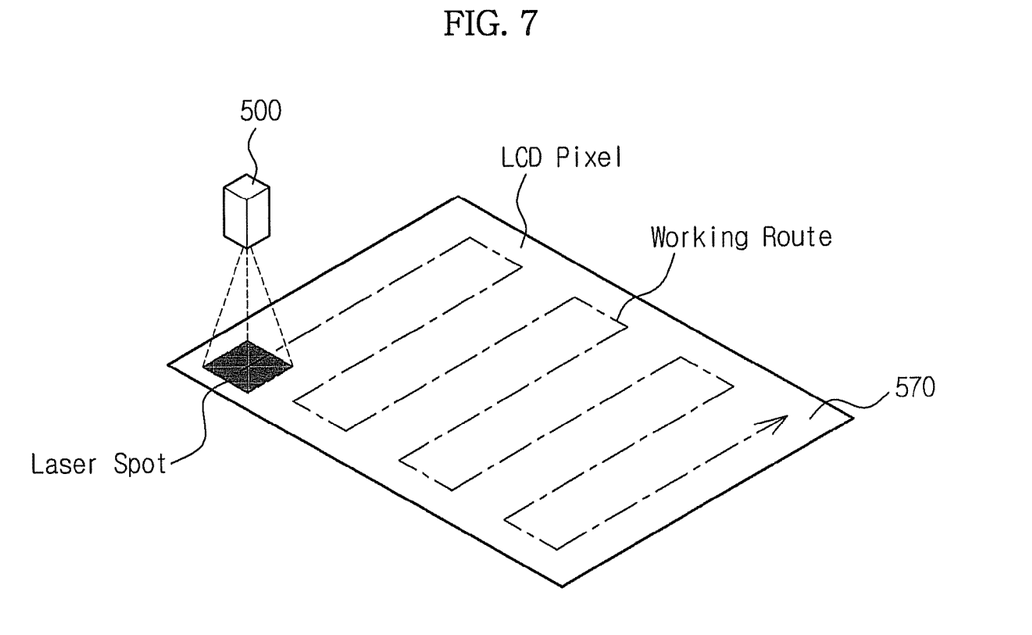
FIG. 7 is a diagram showing a state of repairing an LCD using a repair apparatus having a laser optical system according to example embodiments.

FIG. 7 is a diagram showing a state of repairing an LCD using a repair apparatus having a laser optical system according to example embodiments.

As shown in FIG. 7, the laser optical system 500 repairs a micrometer scale unit pixel of the LCD 570. The laser beam emitted from the laser optical system 500 is irradiated in a predetermined/desired region (laser spot) along a working route of the LCD 570. The irradiated laser beam repairs defect of the LCD 570 along the working route.

Figure 8:
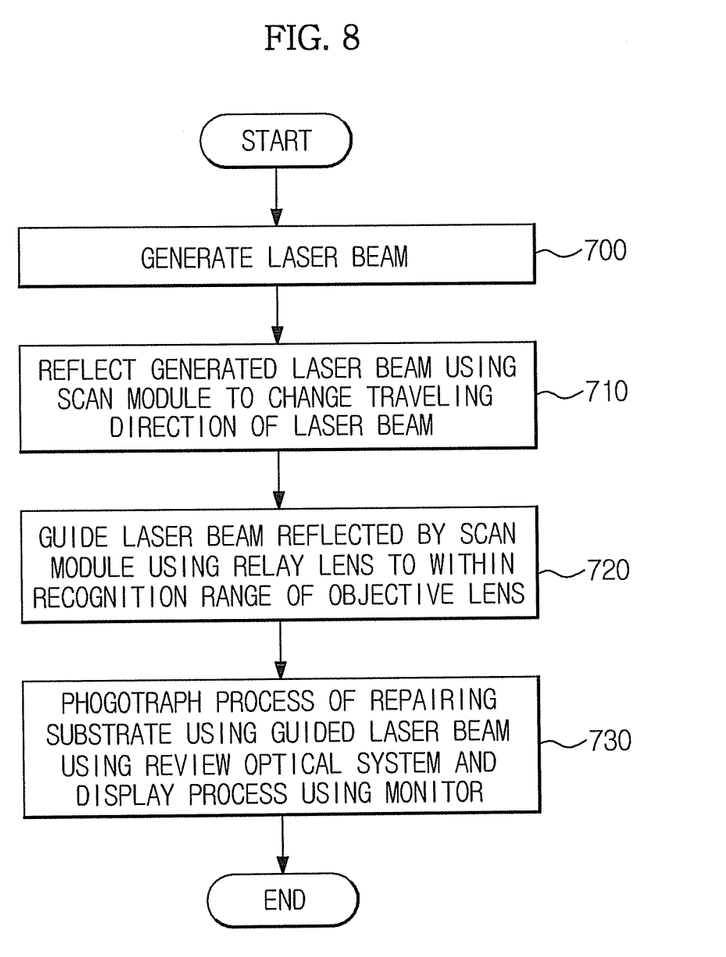
FIG. 8 is a flowchart illustrating a method of operating a repair apparatus having a laser optical system according to example embodiments.

FIG. 8 is a flowchart illustrating a method of operating a repair apparatus having a laser optical system according to example embodiments.

First, the laser generator 501 included in the laser optical system 500 generates a laser beam (700). The generated laser beam is incident upon the scan module 510 through the shutter 503, the beam expander 505, the slit 507 or the tube lens 509. The scan mirror included in the scan module 510 reflects the incident laser beam at various desired angles so as to change the traveling direction of the laser beam (710). The laser beam reflected through the scan mirror of the scan module 510 is incident upon the relay lens 530. The relay lens 530 guides the laser beam a desired direction while preventing spreading (720). The desired direction refers to a direction which enables the objective lens 560 to receive the laser beam. The relay lens 530 prevents loss of the laser beam incident upon the objective lens 560 due to spreading. That is, the laser beam reflected by the scan module 510 through the relay lens 530 is guided to within an incident range of the objective lens 560. The process of repairing the substrate using the laser beam guided by the relay lens 530 is monitored (for example, via photograph(s) or video) using the review optical system 550 in real time and is displayed to the user using the monitor 700 in real time (730). The user performs the laser repair process at a high speed and with high accuracy using the scan module 510 included in the laser optical system 500 while viewing the repair process using the review optical system 550 in real time.

The laser optical system and the repair apparatus and method using the same according to example embodiments are also applicable to a process of repairing an Organic Light Emitting Diode (OLED) or a solar cell or other similar devices in addition to the process of repairing LCD defects.

While example embodiments have been particularly shown and described, it will be understood by one of ordinary skill in the art that variations in form and detail may be made therein without departing from the spirit and scope of the claims.

What is claimed is:

1. A laser optical system comprising:
   a laser generator configured to generate a laser beam;
   at least one scan module configured to reflect the laser beam generated by the laser generator and to direct the laser beam in different directions;
   an objective lens configured to focus the laser beam on a substrate;
   a relay lens configured to guide the laser beam scanned by the at least one scan module to within an incident range of the objective lens;
   a review optical system configured to monitor, in real time, repair of the substrate using the laser beam; and
   a control device configured to control the at least one scan module.

2. The laser optical system according to claim 1, wherein the relay lens is between the at least one scan module and the objective lens and an optical space is between the at least one scan module and the objective lens, the optical space enabling display of the repair of the substrate using the review optical system in real time.

3. The laser optical system according to claim 2, wherein the substrate is a Liquid Crystal Display (LCD) and the laser beam repairs defects of the LCD.

4. The laser optical system according to claim 3, wherein the objective lens is configured to compress the laser beam to a pixel size of the LCD.

5. The laser optical system according to claim 4, wherein the at least one scan module is configured to change a travel direction of the laser beam into at least two different directions.

6. The laser optical system according to claim 5, wherein
   the at least two different directions are an X axis direction and a Y axis direction,
   the at least one scan module includes at least two scan mirrors,
   the at least two scan mirrors are configured to continuously scan the laser beam, and
   one of the at least two scan mirrors scans the laser beam along the X axis direction and the other scan mirror of the at least two scan mirrors scans the laser beam along the Y axis direction.

7. The laser optical system according to claim 5, including at least two scan modules, wherein
   each scan module of the at least two scan modules includes one scan mirror,
   one scan module of the at least two scan modules scans the laser beam along an X axis direction and the other scan module of the at least two scan modules scans the laser beam along a Y axis direction.

8. The laser optical system according to claim 5, wherein the at least one scan module includes one scan mirror, the scan mirror configured to scan the laser beam along X and Y axes directions.

9. The laser optical system according to claim 5, wherein the control device is configured to control a position of a spot of the laser beam emitted from the objective lens on the substrate.

10. The laser optical system according to claim 9, wherein the review optical system includes,
    an illumination device configured to provide illumination during monitoring of the repair,
    an auto focusing device configured to correct a focus of the laser optical system or the review optical system, and
    a review camera configured to monitor the repair of the LCD in real time.

11. The laser optical system according to claim 1, further comprising:
    a tube lens configured to be detachably provided such that the laser optical system can be switched between an image-to-image optical system and a spot optical system.

12. The laser optical system according to claim 11, wherein the laser optical system is configured to function as an image-to-image optical system when the tube lens is included between the laser generator and the scan module and is configured to function as a spot optical system when the tube lens is not included.

13. A repair apparatus, comprising:
    the laser optical system according to claim 1;
    a gantry configured to include the laser optical system mounted thereon;
    a stage configured to have the substrate placed thereon; and
    a monitor configured to display a result of the monitoring by the review optical system.

14. A repair method, comprising:
    generating a laser beam to repair a substrate;
    reflecting the generated laser beam using at least one scan module to direct the laser beam in different directions;
    focusing the laser beam on the substrate using an objective lens;
    guiding the scanned laser beam using a relay lens to within an incident range of the objective lens;
    monitoring repair of the substrate in real time using a review optical system; and
    displaying a result of the monitoring in real time.

* * * * *